May 27, 1941.   J. C. MARIS   2,243,640
SIX WHEEL TRUCK
Filed July 19, 1938    2 Sheets-Sheet 1

INVENTOR
JAMES C. MARIS
BY
ATTORNEY

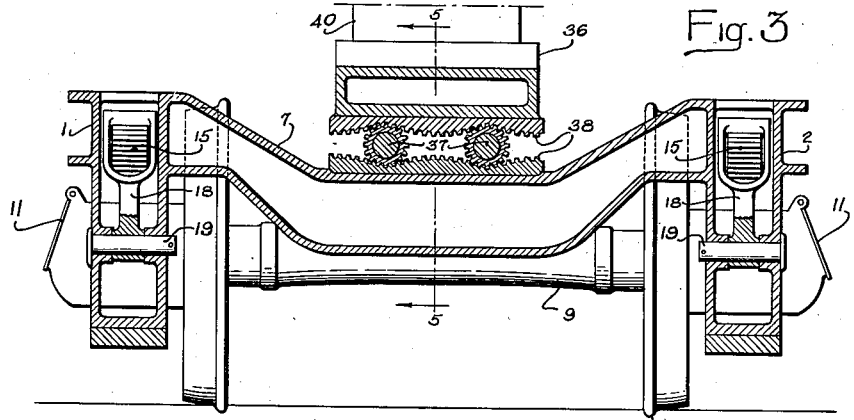
Fig. 3
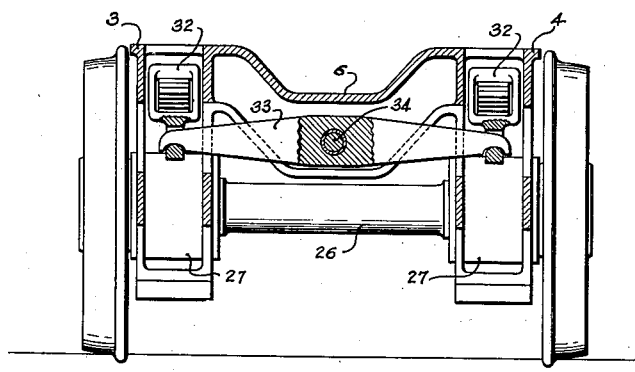
Fig. 4
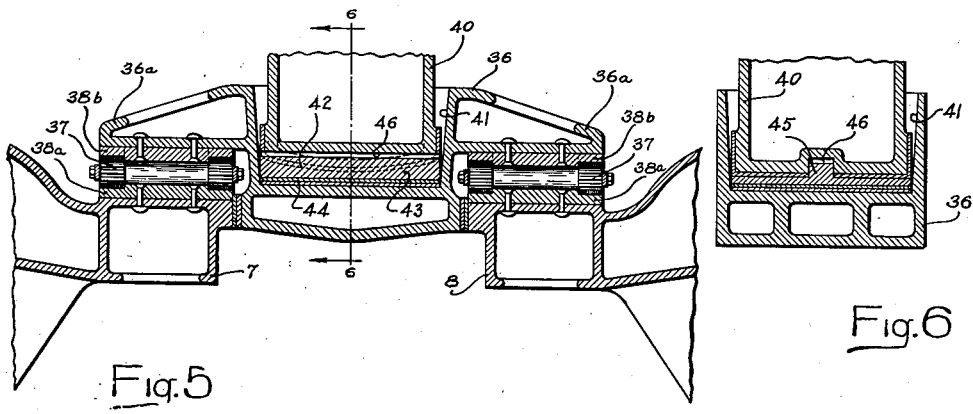
Fig. 5
Fig. 6

Patented May 27, 1941

2,243,640

UNITED STATES PATENT OFFICE 2,243,640

SIX WHEEL TRUCK

James C. Maris, Glenolden, Pa.

Application July 19, 1938, Serial No. 220,120

1 Claim. (Cl. 105—196)

This invention relates generally to engine trucks and more particularly to an improved six wheel truck for locomotives.

The trend of locomotive designs has been and is continuing to be toward more efficient and powerful steam locomotives with consequent increase in size and weight. However due to the height and width of the locomotive being definitely limited by existing clearances through tunnels, train platforms, etc., it is seen that any increase in size of the locomotive must be made up by increasing its length. Such increased length introduces very serious problems such as passing around existing track curves as well as slight variations in the level of the track which heretofore have not been of any particular moment with the shorter wheel base types of locomotives.

It is an object of my invention to provide an improved six wheel truck so constructed and arranged that it will allow extraordinary lateral movement of the locomotive while still maintaining a high degree of longitudinal and transverse stability, but without sacrificing the necessary flexibility of the truck or of the individual truck wheels relative to each other.

A further object is to provide a six wheel engine truck having an improved combination of spring rigging systems and center pin construction with a centering mechanism, all arranged so as to avoid interference between the truck and engine cylinders or other elements of the locomotive, while at the same time accomplishing the longitudinal and transverse stability above mentioned.

Other objects and advantages will be more apparent to those skilled in the art from the following description of the accompanying drawings in which:

Fig. 3 is a transverse section taken on the line 3—3 of Fig. 1;

Fig. 4 is a transverse section taken on the line 4—4 of Fig. 1;

Fig. 5 is a longitudinal section taken substantially on the line 5—5 of Fig. 3;

Fig. 6 is a transverse section taken substantially on the line 6—6 of Fig. 5.

Figures 1, 2:
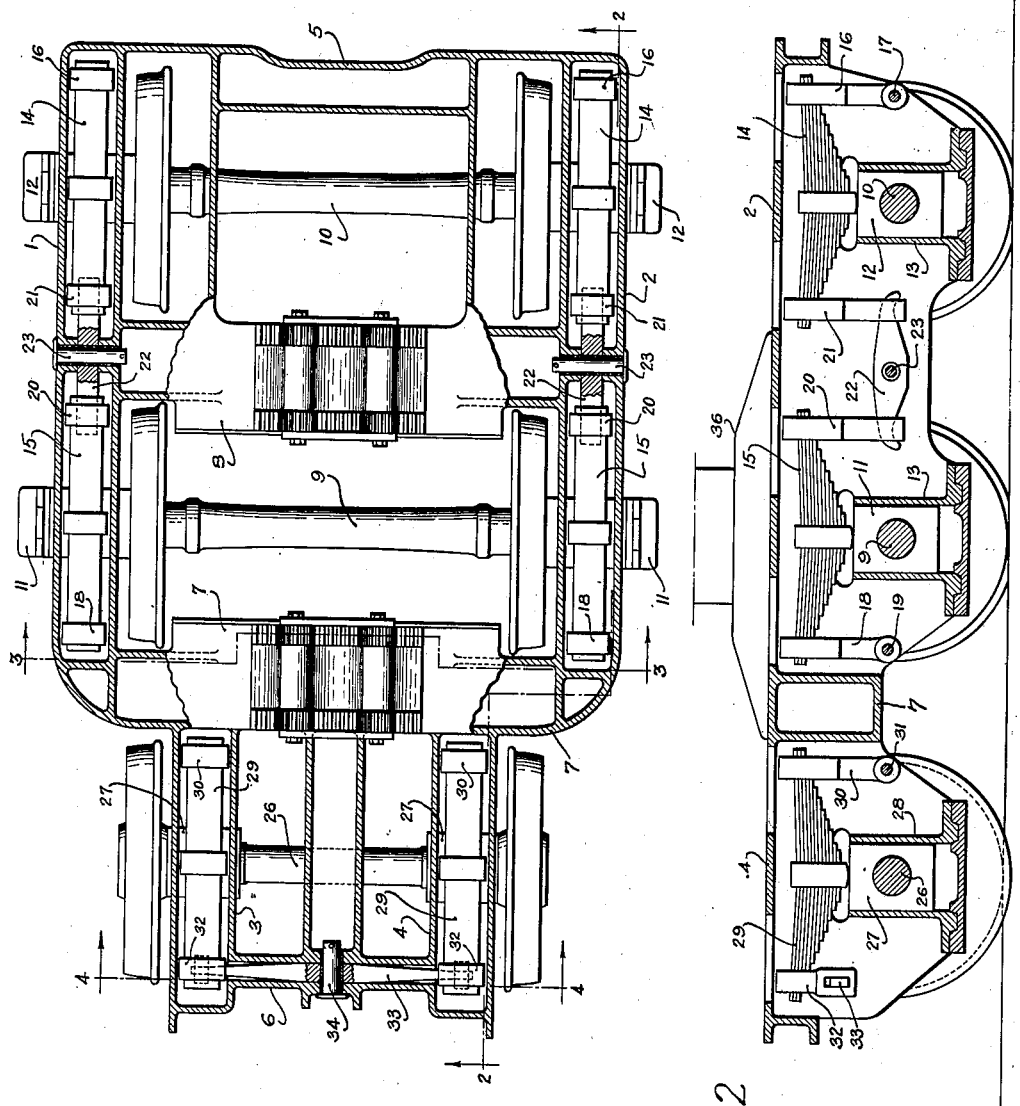
Fig. 1 is a plan view of my improved truck partly broken away to show details of construction and with the bolster and center pin omitted for clarity.
Fig. 2 is a longitudinal section taken substantially on the line 2—2 of Fig. 1.

In the particular embodiment of the invention, such as is disclosed herein merely for the purpose of illustrating certain specific forms among possible others that the invention might take in practice, I have shown a truck frame preferably of the integrally cast type having hollow side wheel pieces 1 and 2 widely spaced apart and a forwardly projecting narrow truck extension comprising hollow longitudinal frame members in the form of side rails 3 and 4. The side wheel pieces 1 and 2 and the rails 3 and 4 are respectively cross connected by hollow transverse frame portions such as end sills 5 and 6. Also, transoms 7 and 8 connect the wheel pieces 1 and 2, the transom 7 specifically connecting the ends of the side wheel pieces 1 and 2 adjacent the narrow frame end of the truck. The hollow longitudinal frame members 3 and 4 project from said transom or transverse member 7 and are offset inwardly from the side wheel pieces 1 and 2 which terminate at the transom 7. The widely spaced rearward portion of the truck frame has a rear-most wheeled axle 10 and an intermediate wheeled axle 9, each journalled in outside boxes 11 and 12, Fig. 2. These boxes are guided for usual vertical movement in pedestal ways 13. A spring rigging system for the wheeled axles 9 and 10 comprises sets of longitudinal leaf springs 14 and 15 located respectively within the hollow side wheel pieces on each side of the frame. Inasmuch as the truck is symmetrical about its longitudinal centerline, it will suffice to describe only one side thereof. As shown in Fig. 2 the spring 14 is supported upon journal box 12 and is connected to the wheel pieces by a spring link 16 connected by a stationary pivot 17 to the side wheel pieces. Similarly, the forward end of spring 15 is connected by a spring link 18 and a stationary pivot 19 to the side wheel pieces. The adjacent ends of springs 14 and 15 have spring links 20 and 21 pivotally connected to a longitudinal equalizing beam 22 which in turn is transversely pivotally connected at 23 to the side wheel pieces at approximately midway between the wheeled axles 9 and 10. This spring arrangement provides two points 23, 23 of a three point spring suspension system as will appear presently.

The forward truck frame extension 3, 4 has a wheeled axle 26 provided with inside journal boxes 27 vertically guided in usual pedestal ways 28, 28. Longitudinal leaf springs 29, supported on each of the journal boxes 27, have their rear ends connected by a spring link 30 to the truck frame through a fixed pivot 31. The front ends of springs 29 are connected by relatively short spring links 32 to a cross equalizing beam 33 which has a stationary longitudinal pivot 34 secured to the frame at approximately the longitudinal centerline thereof, this cross equalizing beam 33 being disposed within one of the hollow transverse portions of the truck frame specifically shown herein at the end sill 6. The pivot 34 constitutes the third point of the three point suspension system thereby allowing the truck frame to be bodily flexible in a transverse direction.

From the foregoing spring rigging arrangements, it is seen that while the truck frame is bodily flexible, yet the springs 14, 15 on each side of the truck frame are widely spaced from the longitudinal centerline and hence offer a relatively large resisting moment to vertical movement of the wheels, whereas the springs 29, 29 and their transverse equalizing beam 33 provide a shorter resisting moment arm from the centerline of the truck. Hence these two different moment arms of the two independent systems tend to provide a damping effect against harmonic vibrations which usually arise in spring arrangements. This damping is generally accomplished in prior art arrangements by employing multiple springs of different characteristics, but in my present invention I have maintained the simplicity of a usual spring rigging system without embodying the complications of the usual dampening springs and at the same time I have provided a truck which allows excessively long locomotives to have the proper degree of stability together with large lateral movement and necessary flexibility to accommodate the truck to various levels of the track.

To allow, in combination with my improved spring rigging, extraordinary lateral movement while still maintaining maximum stability, I have provided any suitable or usual type of lateral motion bolster 36 supported between and laterally guided by the transoms 7 and 8 and have embodied therein a gear type centering device generally indicated at 37. This device, as is well-known, has tracks 38 with inclined portions tending to restore the bolster 36 to its center position when initially moved therefrom. The centering device 37 has its lower gear track 38a mounted upon transoms 7 and 8, while the upper gear track 38b is secured to the underside of longitudinal wings 36a of the bolster. However, to allow my improved six wheel truck and spring system thereof to operate to its fullest in accomplishing the various functions heretofore pointed out, I have provided a center pin 40 disposed within a tapered recess 41 in the bolster. The lower end of the center pin 40 has a curved surface 42 which is of semi-cylindrical form, that is, the pin 40 and bolster 36 can have substantial rocking movement in only one direction relative to each other, this movement being in a longitudinal plane. The curved surface 42 is supported in a similarly curved seat in a plate 43 which, in turn, can revolve about a vertical axis on flat liners 44. To maintain the curved surface 42 in complete seating contact with the curved seat of plate 43, as during rotation of the plate, I have provided a tongue 45 on the plate projecting upwardly into a recess 46. As is seen in Fig. 5, a tongue 45 and recess 46 extend straight across the entire length of the center pin and plate.

From the foregoing disclosure, it is seen that my improved truck with its outside journal boxes for the rear axles and its inside journal boxes for the front axle, together with the longitudinal and transverse equalizing systems independently associated with said inside and outside journalled axles as well as the center pin arrangement restricted only to longitudinal rocking, will allow lateral truck movement combined with a high degree of stability and yet provide for complete accommodation of the truck to variations in the level of the track without danger of the spring riggings setting up harmonic movements. These improved results and mode of operation are applicable to my improved truck regardless of the direction in which it runs. Hence for purposes of simplicity the axle 10 has been broadly referred to as the "rear" axle and the axle 26 has been referred to as the "front" axle, although obviously these terms can be reversed while retaining the identical structure of the truck.

It will of course be understood that various changes in details of construction and arrangement of parts may be made by those skilled in the art without departing from the spirit of the invention as set forth in the appended claim.

I claim:

A six wheel truck comprising, in combination, a single rigid frame having side wheel pieces connected at one of their ends by a transverse member, longitudinal frame members projecting from said transverse member and offset inwardly from said side wheel pieces thereby providing a truck which is relatively wide at one end and relatively narrow at the other end, said side wheel pieces terminating at said transverse member, each of said side wheel pieces having two pedestals and said longitudinally extending frame members each having a pedestal, a wheeled axle having outboard journal boxes slidably guided in one pair of the pedestals of said side wheel pieces, a second wheeled axle also having outboard journal boxes slidably guided in the other pair of pedestals of said side wheel pieces, and a third wheeled axle having inboard bearings slidably guided in the pedestals of the longitudinally extending frame members whereby the relatively narrow frame end formed by said longitudinal frame members allows the wheels of said third axle to be outwardly clear of the truck frame.

JAMES C. MARIS.